(12) United States Patent  (10) Patent No.: US 8,583,634 B2
MacVarish  (45) Date of Patent: Nov. 12, 2013

(54) SYSTEM AND METHOD FOR DETERMINING SOCIAL RANK, RELEVANCE AND ATTENTION

(75) Inventor: Richard Bruce MacVarish, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 401 days.

(21) Appl. No.: 11/951,004

(22) Filed: Dec. 5, 2007

(65) Prior Publication Data

US 2008/0133605 A1  Jun. 5, 2008

Related U.S. Application Data

(60) Provisional application No. 60/872,832, filed on Dec. 5, 2006.

(51) Int. Cl.
G06F 17/00 (2006.01)

(52) U.S. Cl.
USPC ............ 707/723; 707/748; 707/752; 705/319

(58) Field of Classification Search
None
See application file for complete search history.

(56) References Cited

U.S. PATENT DOCUMENTS

| | | | |
|---|---|---|---|
| 6,603,755 B1 * | 8/2003 | Parker | 370/342 |
| 2002/0071546 A1 * | 6/2002 | Brennan | 379/379 |
| 2002/0191639 A1 * | 12/2002 | Norby | 370/466 |
| 2003/0050977 A1 * | 3/2003 | Puthenkulam et al. | 709/204 |
| 2003/0195937 A1 * | 10/2003 | Kircher et al. | 709/207 |
| 2005/0278325 A1 * | 12/2005 | Mihalcea et al. | 707/6 |
| 2006/0026298 A1 * | 2/2006 | Zeng et al. | 709/240 |
| 2006/0143236 A1 * | 6/2006 | Wu | 707/104.1 |
| 2006/0184464 A1 * | 8/2006 | Tseng et al. | 706/14 |
| 2006/0235841 A1 * | 10/2006 | Betz et al. | 707/5 |
| 2006/0253566 A1 * | 11/2006 | Stassinopoulos et al. | 709/224 |
| 2006/0294124 A1 * | 12/2006 | Cho | 707/101 |
| 2007/0061219 A1 * | 3/2007 | Palestrant et al. | 705/26 |
| 2007/0112761 A1 * | 5/2007 | Xu et al. | 707/5 |
| 2007/0112768 A1 * | 5/2007 | Majumder | 707/7 |
| 2007/0174432 A1 * | 7/2007 | Rhee et al. | 709/219 |
| 2007/0192306 A1 * | 8/2007 | Papakonstantinou et al. | 707/5 |
| 2007/0198510 A1 * | 8/2007 | Ebanks | 707/5 |
| 2007/0214131 A1 * | 9/2007 | Cucerzan et al. | 707/5 |
| 2008/0016071 A1 * | 1/2008 | Frieden | 707/7 |
| 2008/0027936 A1 * | 1/2008 | Liu et al. | 707/7 |
| 2008/0059576 A1 * | 3/2008 | Liu et al. | 709/204 |
| 2008/0070209 A1 * | 3/2008 | Zhuang et al. | 434/236 |
| 2008/0086534 A1 * | 4/2008 | Bardak et al. | 709/206 |
| 2008/0109491 A1 * | 5/2008 | Gupta | 707/104.1 |

OTHER PUBLICATIONS

Hwai-Hui Fu, Damping factor in Google page ranking, Sep. 2006, Applied Stochastic Models in Business and Industry, vol. 22 Issue 5-6, pp. 431-444.*

* cited by examiner

*Primary Examiner* — Mohammad S Rostami

(74) *Attorney, Agent, or Firm* — Anderson Gorecki & Rouille LLP

(57) ABSTRACT

A method, apparatus and computer program product for determining social rank, relevance and attention is presented. Persons who communicate with a user are determined. A Communications Rank (CommRank) is determined for the persons for said user, the CommRank taking into account a damping factor of prestige of the persons who communicate with the user, a total number of persons communicating with the user; a rank of a collection of linked communications to and from the user, and a proportional distribution of prestige between the user and the collection of linked communications to and from the user.

18 Claims, 4 Drawing Sheets

SYSTEM AND METHOD FOR DETERMINING SOCIAL RANK, RELEVANCE AND ATTENTION

CROSS REFERENCE TO RELATED APPLICATIONS

The present application claims the benefit of U.S. Provisional Patent Application No. 60/872,832, filed on Dec. 5, 2006, which is incorporated herein by reference in its entirety.

BACKGROUND

While the concept of social software and social networks is gaining recognition, users may not be able to review and optimize, their personal or professional social network. Users are increasingly suffering from information and conversation overload and would like to identify the most important and the most relevant information and conversations to optimize the allocation of their attention. Accurately calculating a person's social network based on real time communication actions enables significant improvement in personal and professional productivity.

The status of a person in a social context or network is commonly defined in terms of two factors: the total number of endorsements the person receives from other people and the prestige of those endorsers. These two factors indicate the distinction between popularity and expert appreciation or prestige of someone respectively. This framework of popularity and prestige has been commonly applied in the assessment and ranking of scholarly writings based on citations and status of references. It has also been the basis for today's some of today's Internet search engines.

The founders of Google's search engine defined an algorithm—the PageRank algorithm—to assess the rank of web pages by determining the popularity and prestige of referring (e.g. linked) web pages. Modeled on the framework for ranking scholarly writings, the PageRank algorithm has become the standard to evaluate the status of web pages and the engine to determine the relevance of web content and advertising based on a Google user's search queries. PageRank indexes web pages, filters them and presents the most relevant information to the user.

SUMMARY

Conventional mechanisms such as those explained above suffer from a variety of deficiencies. One such deficiency is that while users can determine the popularity and prestige of web pages based on PageRank to identify information that is most relevant and ranked based on popularity and prestige, users cannot do the same for their personal and professional social networks. Google's method for node ranking in a linked database describes how to rank a web page based on the volume and quality of web pages linked to the target page. PageRank equally distributes the quality—the "prestige"—of a web pages' links.

Embodiments of the invention significantly overcome such deficiencies and provide mechanisms and techniques that apply the principles of popularity and prestige to create and optimize real time personal social networks based on a user's communication actions. Profiling a user's social network based on their specific communications with popular and/or prestigious users is a unique application of ranking algorithms applied to personal communication applications In a particular embodiment of a method of determining social rank, relevance and attention, the method includes determining persons who communicate with a user. The method further includes determining a Communications Rank (CommRank) of the persons for the user, the CommRank taking into account a damping factor of prestige of the persons who communicate with the user, a total number of persons communicating with the user; a rank of a collection of linked communications to and from the user, and a proportional distribution of prestige between the user and the collection of linked communications to and from the user.

Other embodiments include a computer readable medium having computer readable code thereon for determining social rank, relevance and attention. The computer readable medium includes instructions for determining persons who communicate with a user. The computer readable medium further includes instructions for determining a Communications Rank (CommRank) of the persons for the user, the CommRank taking into account a damping factor of prestige of the persons who communicate with the user, a total number of persons communicating with the user; a rank of a collection of linked communications to and from the user, and a proportional distribution of prestige between the user and the collection of linked communications to and from the user.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for determining social rank, relevance and attention as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for determining social rank, relevance and attention as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by. Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A Communications Rank (CommRank) algorithm is utilized to provide a ranking for a users communications across the user's personal and professional network. The CommRank is provided by iterating an equation which propagates popularity and prestige values prioritized on communication links from one person to another and converges to a solution.

By calculating CommRank based on a user's communications actions across their personal and professional network, numerous personal and team productivity solutions emerge. These include a graphical mapping of user communications to and from their social network, the planning of future communications to improve their connection with their network, prioritization engines for in-coming communications; identification of popular and or prestigious people in a user's social network, selection of optimum communications modes to connect with a specific member, and integration with identity and profiles of users across the social network.

Figure 1:
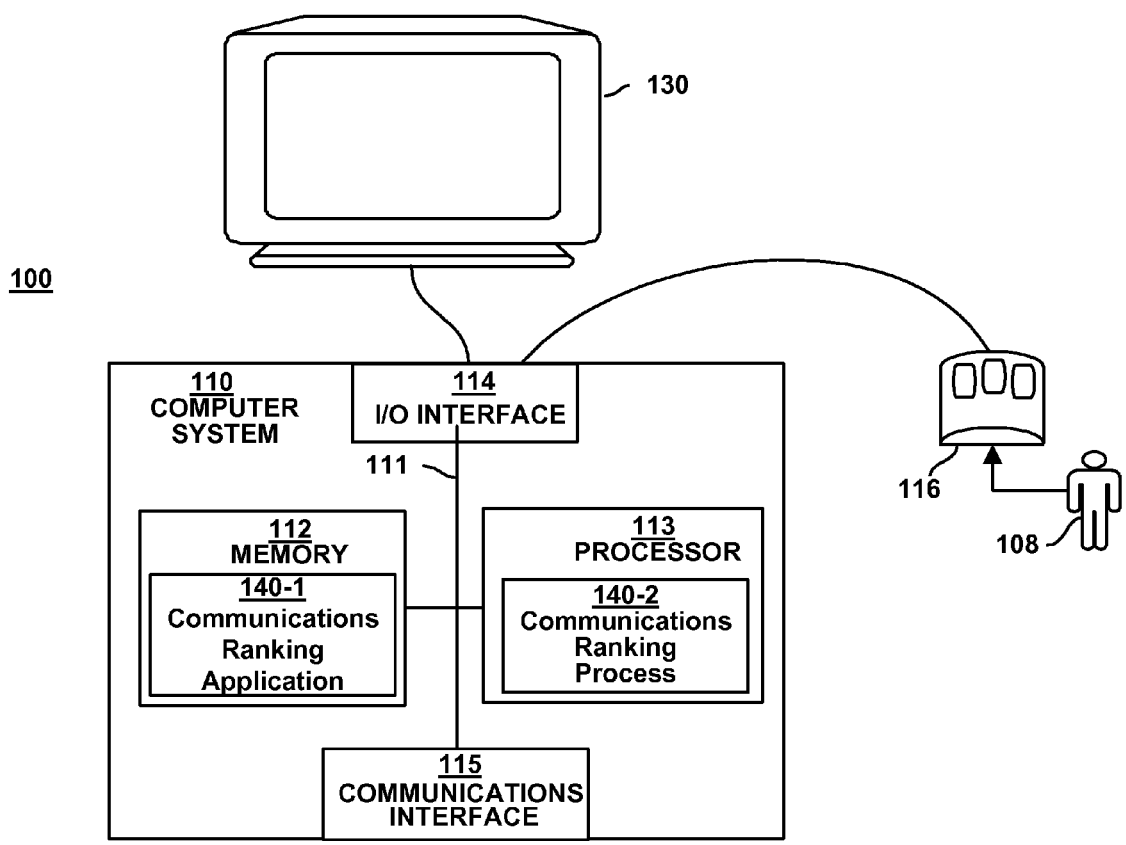
FIG. 1 illustrates an example computer system architecture for a computer system that determines social rank, relevance and attention in accordance with embodiments of the invention.

An example CommRank equation that ranks one person to another based on their direct and extended communication links—both in and out—is:

$$CRw(ui) = (1-d)/N + d * \text{SUM } CRw(uj) \times p(uj, ui)$$

where: ui=the recipient user
uj=collection of linked communications to and from persons for ui
d=damping factor of prestige of linked people
N=total number of people communicated with (to and from)
p=proportional distribution of prestige between uj and ui
where: $p(uj, ui) = W(ui, uj) / \text{SUM } W(vj, vk)$
where: W=proportional share of communication links to and from persons for ui FIG. 1 is a block diagram illustrating an example computer system 100 for calculating a communications rank function 140 and/or other related processes to carry out the different functionality as described herein.

As shown, computer system 100 of the present example includes an interconnect 111 that couples a memory system 112 and a processor 113 an input/output interface 114, and a communications interface 115.

As shown, memory system 112 is encoded with communications rank application 140-1. Communications rank application 140-1 can be embodied as software code such as data and/or logic instructions (e.g., code stored in the memory or on another computer readable medium such as a disk) that support functionality according to different embodiments described herein.

During operation, processor 113 of computer system 100 accesses memory system 112 via the interconnect 111 in order to launch, run, execute, interpret or otherwise perform the logic instructions of the communications rank application 140-1. Execution of communications rank application 140-1 produces processing functionality in communications rank process 140-2. In other words, the communications rank process 140-2 represents one or more portions of the communications rank application 140-1 (or the entire application) performing within or upon the processor 113 in the computer system 100.

It should be noted that, in addition to the communications rank process 140-2, embodiments herein include the communications rank application 140-1 itself (i.e., the un-executed or non-performing logic instructions and/or data). The communications rank application 140-1 can be stored on a computer readable medium such as a floppy disk, hard disk, or optical medium. The communications rank application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of communications rank application 140-1 in processor 113 as the communications rank process 140-2. Those skilled in the art will understand that the computer system 100 can include other processes and/or software and hardware components, such as an operating system that controls allocation and use of hardware resources associated with the computer system 100.

Figure 2:
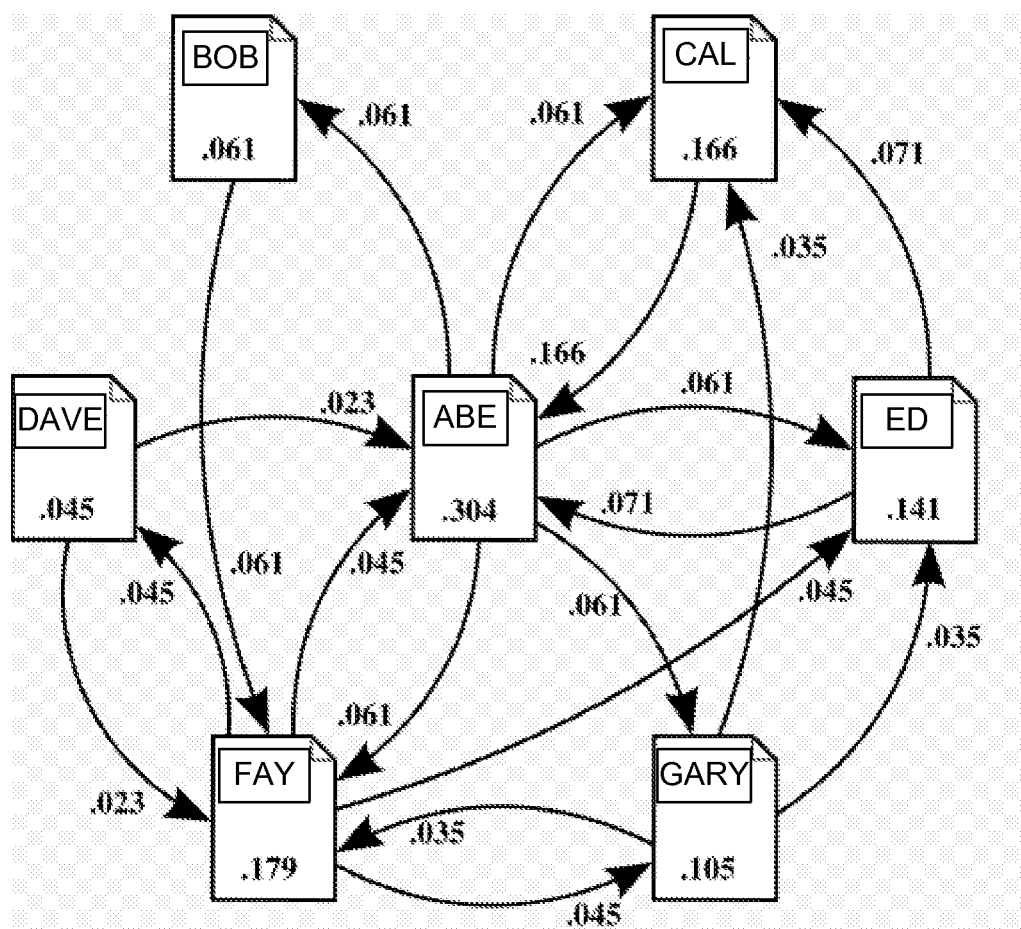
FIG. 2 depicts a diagram showing a ranking of user communications.

Referring now to FIG. 2, a diagram of an example communication ranking 100 is shown. In this example, Abe is the user and is shown as a central node. A small circle of people that Abe communicates with are also shown as nodes with links. Abe communicates with Bob, Cal, Dave, Ed, Fay and Gary.

Each of these nodes includes a link from Abe and may also include a link to Abe. Each link has a corresponding weight assigned to it, used to indicate the amount of time and the associated prestige for that link to that other person. For example, Abe communicates with Bob via a link showing a weight of 0.061. Bob however does not communicate with Abe directly, and instead communicates only with Fay (who may be Bob's supervisor). Fay communicates with Abe and also receives communications from Abe. Each node shows the communications rank of the node. From this diagram it can be seen that Abe has highest communications rank with Fay and the lowest with Dave. From reviewing the communications rank, Abe may see that he needs to spend more time communicating with Dave, and/or less time communicating with Fay.

Figure 3:
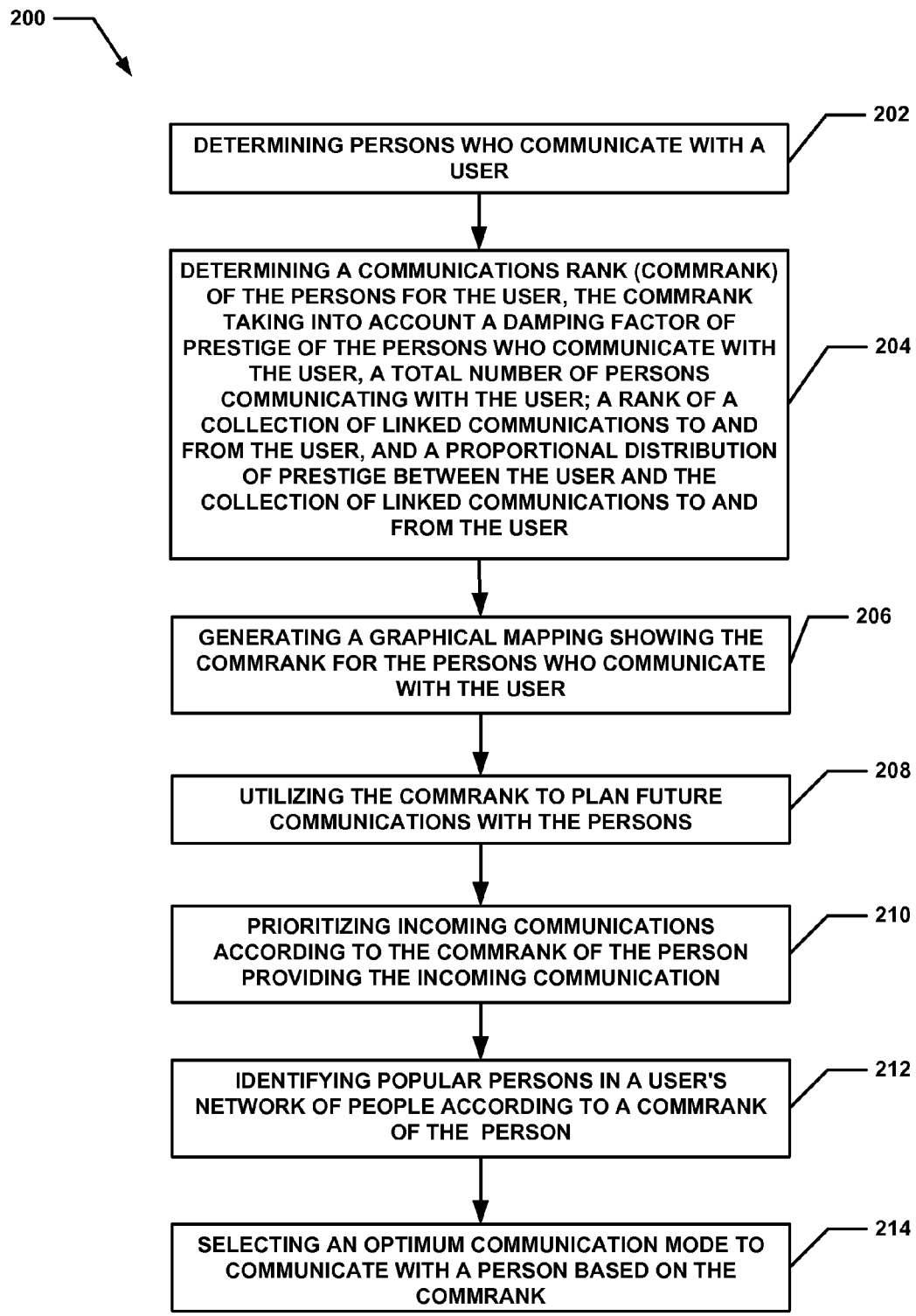
FIG. 3 depicts a flow diagram of a particular embodiment of a method for determining and utilizing social rank, relevance and attention in accordance with embodiments of the invention.
Figure 4:
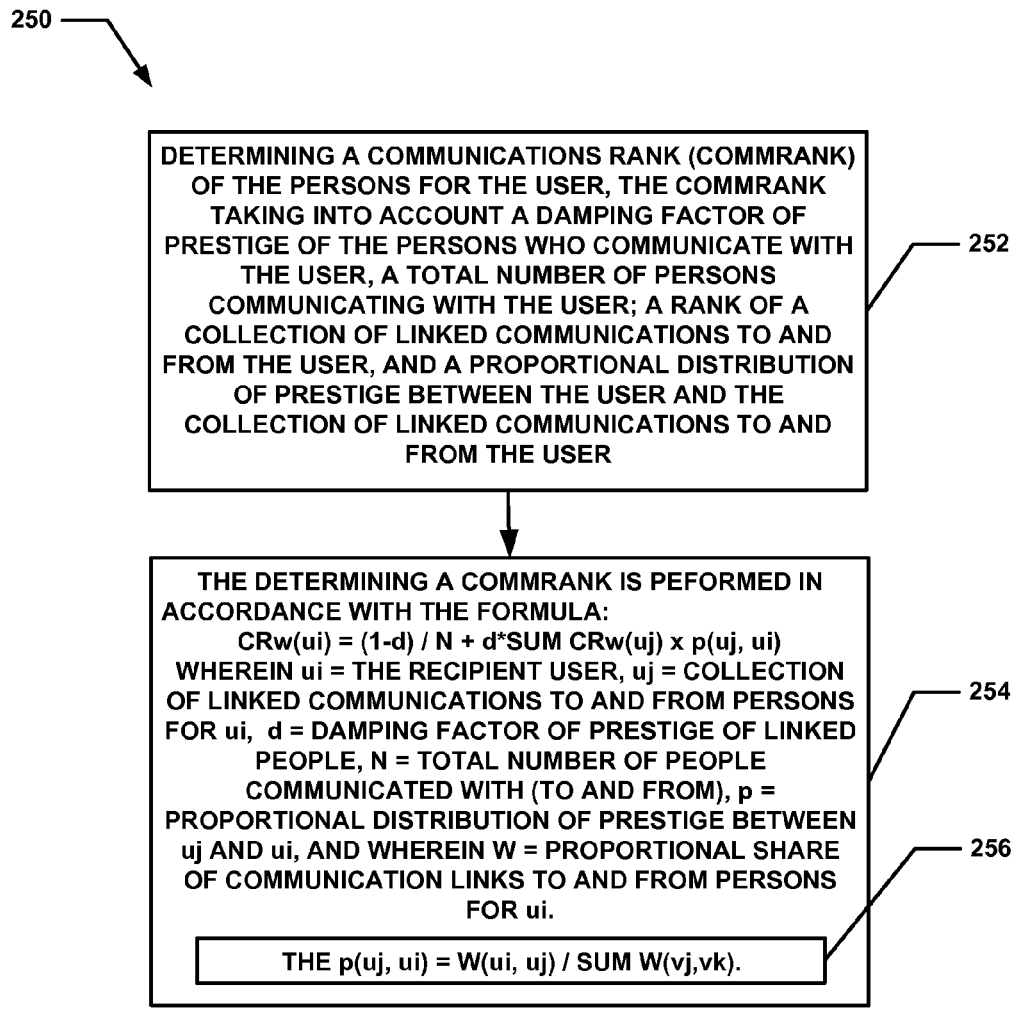
FIG. 4 depicts a flow diagram of a particular technique for determining social rank, relevance and attention in accordance with embodiments of the invention.

A flow chart of the presently disclosed methods are depicted in FIGS. 3 and 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 200 of determining social rank, relevance and attention is shown. Method 200 begins with processing block 202 which discloses determining persons who communicate with a user. The persons a user communicates with may include persons with whom the user has a purely social connection (e.g., friends, neighbors and the like) as well as those with whom the user has a business-only connection (work colleagues, associates, staff and the like) and combinations thereof. The communications means may include phone calls, voice mail, Instant Messages (IM), web and email logs, and conversations.

Processing block 204 states determining a Communications Rank (CommRank) of the persons for the user, the CommRank taking into account a damping factor of prestige of the persons who communicate with the user, a total number of persons communicating with the user; a rank of a collection of linked communications to and from the user, and a proportional distribution of prestige between the user and the collection of linked communications to and from the user.

Processing block 206 recites generating a graphical mapping showing the CommRank for the persons who communicate with the user. An example of such a graphical mapping is shown in FIG. 2 and described in detail in co-pending patent application Ser. No. 11/950,995, filed on even date herewith, the disclosure of which is incorporated by reference in its entirety.

Processing continues with processing block 208 which states utilizing the CommRank to plan future communications with the persons. For example, the user can determine who needs to be communicated with more by analyzing the CommRank for various persons in the users social network.

Processing block 210 discloses prioritizing incoming communications according to the CommRank of the person providing the incoming communication. Thus, a communication from a business acquaintance may have precedence over a communication from a purely social acquaintance.

Processing block 212 recites identifying popular persons in a user's network of people according to a CommRank of the person. By analysis of the CommRanks of various persons in the user's social network, the user may realize that he or she is spending more time with one person than with another.

Processing block 214 states selecting an optimum communication mode to communicate with a person based on the CommRank. For example, a user may prefer to communicate via a less formal means such as IM with a social colleague and via a more private means such as by way of private conversations with a business colleague.

Referring now to FIG. 4 a particular embodiment of a method 250 of determining a communications rank (CommRank) is shown. Method 250 begins with processing block 252 which discloses determining a Communications Rank (CommRank) of the persons for the user, the CommRank taking into account a damping factor of prestige of the persons who communicate with the user, a total number of persons communicating with the user; a rank of a collection of linked communications to and from the user, and a proportional distribution of prestige between the user and the collection of linked communications to and from the user.

As shown in processing block 254, the determining a CommRank is performed in accordance with the formula:

$$CRw(ui)=(1-d)/N+d*\text{SUM } CRw(uj) \times p(uj,ui)$$

wherein ui=the recipient user, uj=collection of linked communications to and from persons for ui, d=damping factor of prestige of linked people, N=total number of people communicated with (to and from), p=proportional distribution of prestige between uj and ui, and wherein W=proportional share of communication links to and from persons for ui. As further shown in processing block 256, in this particular example, the p(uj, ui)=W(ui, uj)/SUM W(vj,vk).

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The devices or computer systems that integrate with the processors may include, for example, a personal computers, workstations (e.g., Sun, HP), personal digital assistants (PDAs), handheld devices such as cellular telephones, laptops, handheld computers, or another devices capable of being integrated with a processors that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environments, and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of determining social rank, relevance and attention comprising:
    determining a plurality of persons who communicate with a user;
    determining a Communications Rank (CommRank) for each of two or more persons in the determined plurality of persons, each determined CommRank taking into account a damping factor of prestige of persons who communicate with the user, a total number of persons communicating with the user, a rank of a collection of linked communications to and from the user, and a proportional distribution of prestige between the user and the collection of linked communications to and from the user, wherein a CommRank is determined in accordance with the formula:

$$CRw(ui)=(1-d)/N+d*SUM\ CRw(uj) \times p(uj, ui),$$

wherein ui=a recipient user, uj=a collection of linked communications to and from persons for ui, d=a damping factor of prestige linked people, N=a total number of people communicated with (to and from), and p=a proportional distribution of prestige between uj and ui;
    prioritizing a plurality of incoming communications originated by the two or more persons according to determined CommRanks for the two or more persons; and
    selecting an optimum communication mode to communicate with a person originating an incoming communication, in the plurality of incoming communications, based on a determined CommRank for the person.

2. The method of claim 1 further comprising:
    generating a graphical mapping showing the determined CommRanks for the two or more persons.

3. The method of claim 1 further comprising:
    utilizing the determined CommRank of the person to plan future communications with the person.

4. The method of claim 1 further comprising:
    identifying one or more popular persons in the plurality of persons according to the determined CommRanks of the identified one or more popular persons.

5. The method of claim 1 wherein p(uj, ui) is determined in accordance with the formula:

$$p(uj, ui)=W(ui, uj)/SUM\ W(vj,vk),$$

wherein W=a proportional share of communication links to and from persons for ui.

6. A non-transitory computer readable storage medium having computer readable code thereon for determining social rank, relevance and attention, the medium comprising:
    instructions for determining a plurality of persons who communicate with a user;
    instructions for determining a Communications Rank (CommRank) for each of two or more persons in the determined plurality of persons each determined CommRank taking into account a damping factor of prestige of persons who communicate with the user, a total number of persons communicating with the user, a rank of a collection of linked communications to and from the user, and a proportional distribution of prestige between the user and the collection of linked communications to and from the user, wherein a CommRank is determined in accordance with the formula:

$$CRw(ui)=(1-d)/N+d*SUM\ CRw(uj) \times p(uj, ui),$$

wherein ui=a recipient user, uj=a collection of linked communications to and from persons for ui, d=a damping factor of prestige linked people, N=a total number of people communicated with (to and from), and p=a proportional distribution of prestige between uj and ui;
    instructions for prioritizing a plurality of incoming communications originated by the two or more persons according to determined CommRanks for the two or more persons; and
    instructions for selecting an optimum communication mode to communicate with a person originating an incoming communication, in the plurality of incoming communications, based on a determined CommRank for the person.

7. The non-transitory computer readable medium of claim 6 further comprising:
instructions for generating a graphical mapping showing the determined CommRanks for the two or more persons.

8. The non-transitory computer readable medium of claim 6 further comprising:
instructions for utilizing the determined CommRank of the person to plan future communications with the person.

9. The non-transitory computer readable medium of claim 6 further comprising:
instructions for identifying popular persons in the plurality of persons according to the determined CommRanks of the identified one or more popular persons.

10. The non-transitory computer readable medium of claim 6 wherein p(uj, ui) is determined in accordance with the formula:

$$p(uj, ui) = W(ui, uj)/\text{SUM } W(vj, vk),$$

wherein W=a proportional share of communication links to and from
a memory;
a processor; persons for ui.

11. A computer system comprising:
a memory;
a processor;
a communications interface;
an interconnection mechanism coupling the memory, the processor and the communications interface; and
wherein the memory is encoded with an application for determining social rank, relevance and attention that when performed on the processor causes the computer system to:
determine a plurality of persons who communicate with a user;
determine a Communications Rank (CommRank) for each of two or more persons in the plurality of persons, each determined CommRank taking into account a damping factor of prestige of persons who communicate with the user, a total number of persons communicating with the user, a rank of a collection of linked communications to and from the user, and a proportional distribution of prestige between the user and the collection of linked communications to and from the user, wherein a CommRank is determined in accordance with the formula:

$$CRw(ui) = (1-d)/N + d*\text{SUM } CRw(uj) \times p(uj, ui),$$

wherein ui=a recipient user, uj=a collection of linked communications to and from persons for ui, d=a damping factor of prestige linked people, N=a total number of people communicated with (to and from), and p=a proportional distribution of prestige between uj and ui;
prioritize a plurality of incoming communications originated by the two or more persons according to determined CommRanks for the two or more persons; and
select an optimum communication mode to communicate with a person originating an incoming communication, in the plurality of incoming communications, based on a determined CommRank for the person.

12. The computer system of claim 11 wherein the application when performed on the processor further causes the computer system to:
generate a graphical mapping showing the determined CommRanks for the two or more persons.

13. The computer system of claim 11 wherein the application when performed on the processor further causes the computer system to:
utilize the determined CommRank for the person originating an incoming communication to plan future communications with the person.

14. The computer system of claim 11 wherein the application when performed on the processor further causes the computer system to:
identify popular persons in the plurality of persons according to the determined CommRanks of the identified one or more persons.

15. The computer system of claim 11, wherein p(uj, ui) is determined in accordance with the formula:

$$p(uj, ui) = W(ui, uj)/\text{SUM } W(vj, vk),$$

wherein W=a proportional share of communication links to and from persons for ui.

16. The method of claim 1 wherein the optimum communication mode is an electronic mode of communications.

17. The non-transitory computer readable storage medium of claim 6 wherein the optimum communication mode is an electronic mode of communications.

18. The computer system of claim 11 wherein the optimum communication mode is an electronic mode of communications.

* * * * *